US009047434B2

(12) United States Patent
Borah et al.

(10) Patent No.: US 9,047,434 B2
(45) Date of Patent: Jun. 2, 2015

(54) CLUSTERING FOR PROCESSING OF CIRCUIT DESIGN DATA

(71) Applicant: Mentor Graphics Corporation, Wilsonville, OR (US)

(72) Inventors: Manjit Borah, Los Altos, CA (US); Ruiming Chen, Fremont, CA (US); Prasanna Srinivas, Cupertino, CA (US); Prashant Varshney, Fremont, CA (US); Amit Jalota, Fremont, CA (US); Kirk Schlotman, Plano, TX (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 13/950,223

(22) Filed: Jul. 24, 2013

(65) Prior Publication Data

US 2015/0033197 A1    Jan. 29, 2015

(51) Int. Cl.
*G06F 17/50* (2006.01)

(52) U.S. Cl.
CPC ........ *G06F 17/5072* (2013.01); *G06F 17/5081* (2013.01)

(58) Field of Classification Search
USPC .......................................... 716/113
See application file for complete search history.

(56) References Cited

U.S. PATENT DOCUMENTS

| 7,814,451 | B2 * | 10/2010 | Furnish et al. | 716/100 |
| 7,921,393 | B2 * | 4/2011 | Furnish et al. | 716/110 |
| 2008/0216039 | A1 * | 9/2008 | Furnish et al. | 716/9 |
| 2008/0216040 | A1 * | 9/2008 | Furnish et al. | 716/10 |
| 2009/0254874 | A1 * | 10/2009 | Bose | 716/6 |

* cited by examiner

*Primary Examiner* — Thuan Do
*Assistant Examiner* — Mohammed Alam (57) ABSTRACT

Nodes in microdevice design data are selected to form initial clusters. Typically the nodes are selected based upon the type of process to be performed on the design data. The initial clusters are then be grown, merged with other nodes, or come combination of both until the processing costs of the final clusters are compatible with the amount of resources that will be used to process the design data.

20 Claims, 6 Drawing Sheets

CLUSTERING FOR PROCESSING OF CIRCUIT DESIGN DATA

TECHNICAL FIELD

Aspects of the present invention relate to the processing of design data for an integrated circuit or other microdevice. Various implementations of the invention may be particularly useful for organizing circuit design data into clusters, for then performing one or more processes, such as a timing optimization process, on the different clusters of the design data independently.

BACKGROUND OF THE INVENTION

Microdevices, such as integrated microcircuits and microelectromechanical systems (MEMS), are used in a variety of products, from automobiles to microwaves to personal computers. Designing and fabricating microdevices typically involves many steps, known as a "design flow." The particular steps of a design flow often are dependent upon the type of microcircuit, its complexity, the design team, and the microdevice fabricator or foundry that will manufacture the microcircuit. Typically, software and hardware "tools" verify the design at various stages of the design flow by running software simulators and/or hardware emulators, and errors in the design are corrected or the design is otherwise improved.

Several steps are common to most design flows for integrated microcircuits. Initially, the specification for a new circuit is transformed into a logical design, sometimes referred to as a register transfer level (RTL) description of the circuit. With this logical design, the circuit is described in terms of both the exchange of signals between hardware registers and the logical operations that are performed on those signals. The logical design typically employs a Hardware Design Language (HDL), such as the Very high speed integrated circuit Hardware Design Language (VHDL). As part of the creation of a logical design, a designer will also implement a place-and-route process to determine the placement of the various portions of the circuit, along with an initial routing of interconnections between those portions. The logic of the circuit is then analyzed, to confirm that it will accurately perform the functions desired for the circuit. This analysis is sometimes referred to as "functional verification."

After the accuracy of the logical design is confirmed, it is converted into a device design by synthesis software. The device design, which is typically in the form of a schematic or netlist, describes the specific electronic devices (such as transistors, resistors, and capacitors) that will be used in the circuit, along with their interconnections. This device design generally corresponds to the level of representation displayed in conventional circuit diagrams. Preliminary timing estimates for portions of the circuit may be made at this stage, using an assumed characteristic speed for each device. In addition, the relationships between the electronic devices are analyzed, to confirm that the circuit described by the device design will correctly provide the same behavior as the original hardware design language description of the circuit design. This analysis is sometimes referred to as "formal equivalence checking" or more generally "formal verification."

Once the relationships between circuit devices have been established, the design is again transformed, this time into a physical design that describes specific geometric elements. This type of design often is referred to as a "layout" design. The geometric elements, which typically are polygons, define the shapes that will be created in various materials to manufacture the circuit. Typically, a designer will select groups of geometric elements representing circuit device components (e.g., contacts, gates, etc.) and place them in a design area. These groups of geometric elements may be custom designed, selected from a library of previously-created designs, or some combination of both. "Place and route" tools, such as the Olympus-SoC tool, available from Mentor Graphics® Corporation of Wilsonville, Oreg., are used for this task. Once the groups of geometric elements representing circuit device components have been placed, geometric elements representing connection lines then are then placed between these geometric elements according to the predetermined route. These lines will form the wiring used to interconnect the electronic devices.

Typically, a designer will perform a number of analyses on the resulting layout design data. For example, with integrated circuits, the layout design may be analyzed to confirm that it accurately represents the circuit devices and their relationships as described in the device design. The layout design also may be analyzed to confirm that it complies with various design requirements, such as minimum spacings between geometric elements. Still further, the layout design may be modified to include the use of redundant geometric elements or the addition of corrective features to various geometric elements, to counteract limitations in the manufacturing process, etc. For example, the design flow process may include one or more resolution enhancement technique (RET) processes, that modify the layout design data to improve the usable resolution of the reticle or mask created from the design in a photolithographic manufacturing process.

After the layout design has been finalized, it is converted into a format that can be employed by a mask or reticle writing tool to create a mask or reticle for use in a photolithographic manufacturing process. The written masks or reticles then can be used in a photolithographic process to expose selected areas of a wafer to light or other radiation in order to produce the desired integrated microdevice structures on the wafer.

Returning to the place-and-route process, this process typically begins with a circuit design described in a register transfer language. Using a place-and-route tool, a designer will place portions of the circuit design relative to each other in a geographic design environment. While these circuit design portions correspond to segments of code in a register transfer language, they typically are represented in the geographic design environment as blocks. Once the blocks have been placed relative to each other, wiring lines are routed between the blocks. These wiring lines represent the interconnections that will be formed between the components of the electrical device. The routing typically takes place in two stages: a coarse or track routing stage, in which groups of wires are routed together between blocks, and detailed routing where the position of individual wires are adjusted.

Initially, the routed wires may not convey clock signals or data signals between the circuit devices sufficiently fast to provide operation times that will perform at the desired clock frequency. In an attempt to optimize the operational timing for the design, a routing tool will make changes to the circuit design according to a variety of routing heuristics. For example, the routing process may insert buffers into the wires, which will speed up the transmission of a signal by amplifying it. The routing tool also may make straighten some lines, or substitute alternate logic that processes signals faster. Still further, the relative position of the blocks may be further adjusted. Some place-and-route tools may employ from 20-30 different techniques to improve ensure the accurate operation of a circuit manufactured from the circuit design.

Various optimization techniques like timing optimization techniques may take place at different times over the course of the place-and-route operation. For example, these optimization techniques may be employed both before and after data signal interconnect routing, and before and after clock signal synthesis. As a result, these optimization techniques may take up to 60%-70% of the execution time of a place-and-route process. Accordingly, reducing the time required for these optimization techniques may significantly reduce the execution time of a place-and-route process.

Various conventional place-and-route tools employ parallel processing to expedite routing optimization techniques, by dividing the implementation of these techniques across multiple processors. For example, some conventional place-and-route tools can divide a hierarchically-organized circuit design into parts based upon its hierarchical structure. Different parts can then be assigned to different processors for implementation of one or more routing techniques. With modern circuit designs, however, the cells that make up a hierarchical structure can be very large, leading to an inefficiently large partition granularity. Also, there may be several clocks signals in a single cell, adding to complexity to the optimization techniques.

BRIEF SUMMARY

Aspects of the invention relate to apparatus and methods for partitioning a circuit design. According to various embodiments of the invention, a circuit is divided into groups or "clusters" of design data, which may be processed in parallel. With some implementations, the clusters of design data are created based upon logical relationships between components of a circuit design rather than physical relationships between those components.

According to some embodiments of the invention, nodes in the microdevice design data are selected to form initial clusters. Typically the nodes are selected based upon the type of process to be performed on the design data. For example, if the process is to reduce timing delay in a microcircuit design, then the selected nodes may be cell pins in the critical paths of the microcircuit design data having the largest delay violations. The initial clusters are then grown, merged with other nodes, or some combination of both until the processing costs of the final clusters are compatible with the amount of resources that will be used to process the design data. For example, the size of the clusters may be bounded based upon their processing times, so that each cluster will take approximately the same time to process. With various implementations of the invention, the number of initial nodes may be much larger than the amount of processing resources, providing a relatively small granularity of initial clusters relative to the amount of processing resources. With this relatively small granularity, the initial clusters can be grown and merged until, for example, the number of final clusters matches the amount of processing resources, and the processing times of each final cluster will be approximately the same. This arrangement will allow the clusters to be processed in parallel for approximately the same amount of time, preventing a few oversized clusters from delaying the processing operation.

With some implementations of the invention, processing operations divided between clusters may be budgeted or otherwise modified so that the clusters may independently be processed in parallel. For example, in a timing delay reduction process, cells in a critical path may be divided among two or more clusters. With these implementations, the total delay violation for the critical path may be budgeted proportionally to each cluster containing a portion of the critical path. If each cluster is then processed to reduce its budgeted delay violations by the desired amount, when the processed cluster data is combined the resulting circuit design data will have eliminated the delay violation for the critical path. Some implementations of the invention may alternately or additionally reassign nodes from one cluster to another cluster so that both clusters may independently be processed in parallel.

DETAILED DESCRIPTION OF THE INVENTION

Illustrative Operating Environment

The execution of various electronic design automation operations according to embodiments of the invention may be implemented using computer-executable software instructions executed by one or more programmable computing devices. Because these embodiments of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools according to embodiments of the invention will be configured to operate on a computing system capable of simultaneously running multiple processing threads. These multiple processing threads may be run on multiple cores of a single processor, on single cores of multiple processors, or some combination thereof. The components and operation of a computer network having a host or master computer and one or more remote or servant computers therefore will be described with reference to FIG. 1. This operating environment is only one example of a suitable operating environment for implementations of the invention, however, and is not intended to suggest any limitation as to the scope of use or functionality of the invention.

Figure 1:
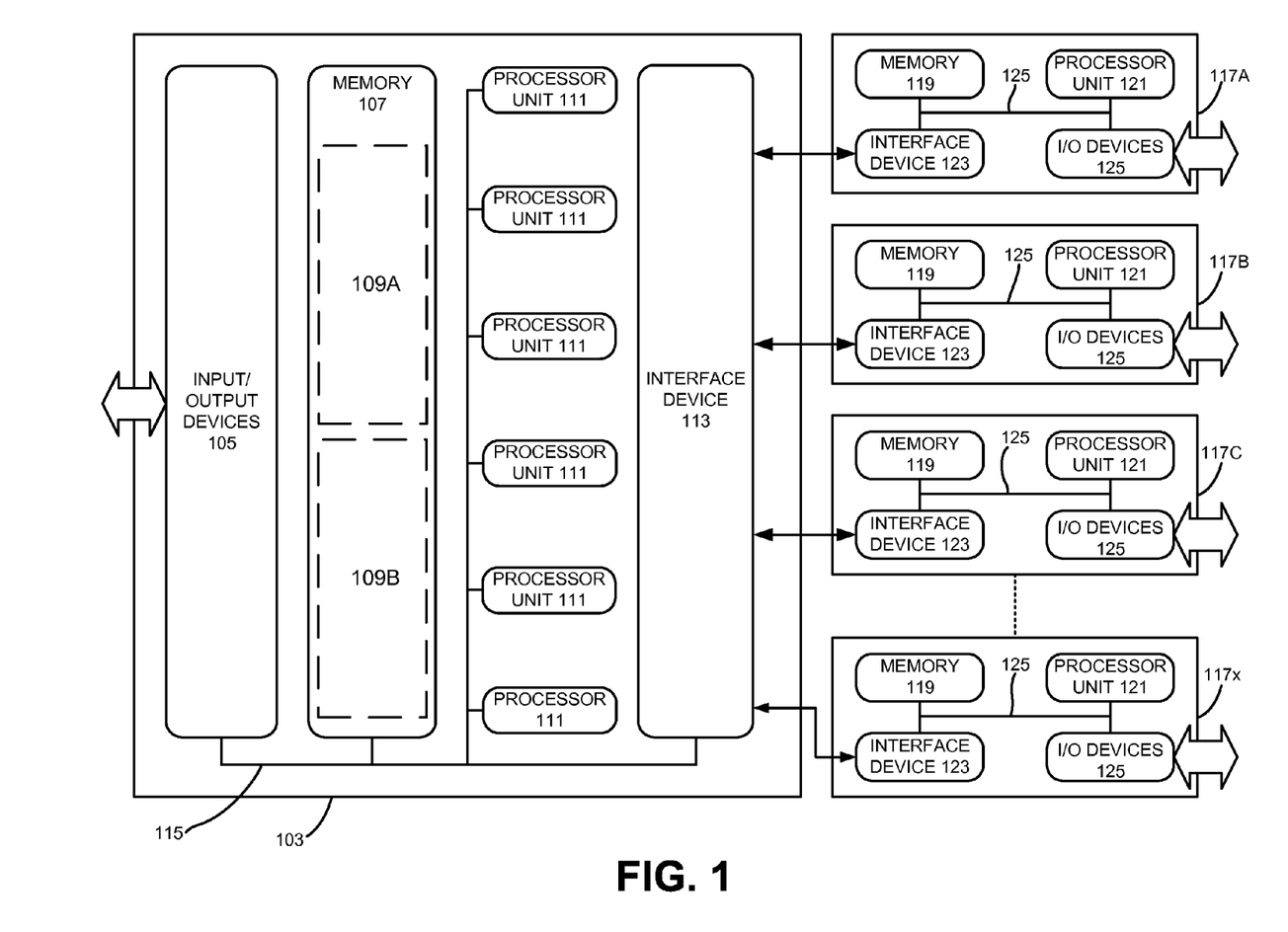
FIGS. 1 and 2 illustrate an example of a computer system of the type that may be used to implement various embodiments of the invention.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media devices that can be accessed by the master computer 103. These computer readable media devices may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media devices may also include magnetic cassettes, magnetic tapes, magnetic disks or other magnetic storage devices, punched media, holographic storage devices, or any other device that can be used to store desired information.

As will be discussed in detail below, the master computer 103 runs a software application for performing one or more operations according to various examples of the invention. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
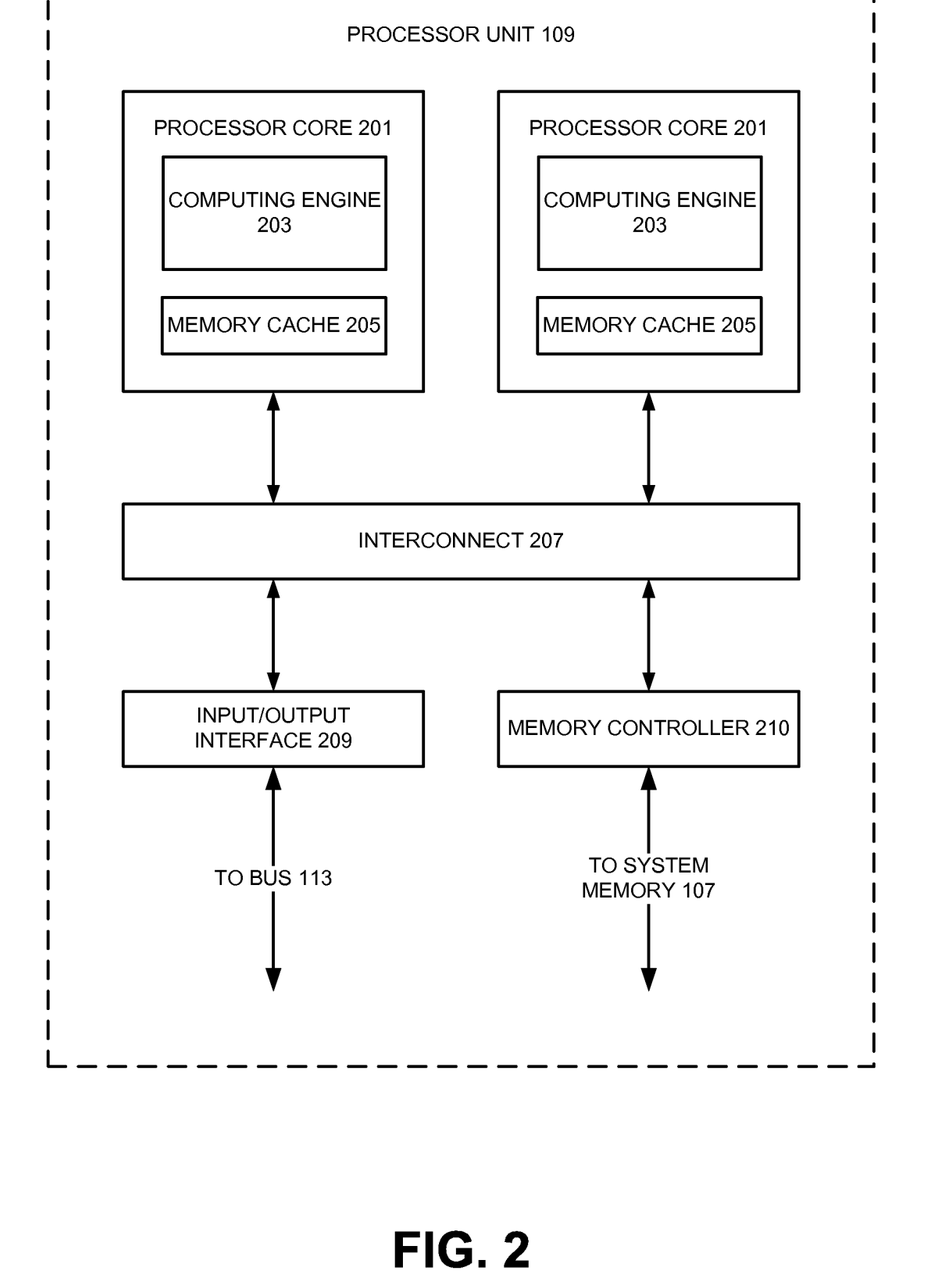

With some implementations of the invention, the master computing device 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 211.

The input/output interface 209 provides a communication interface between the processor unit 201 and the bus 115. Similarly, the memory controller 211 controls the exchange of information between the processor unit 201 and the system memory 107. With some implementations of the invention, the processor units 201 may include additional components, such as a high-level cache memory accessible shared by the processor cores 201.

While FIG. 2 shows one illustration of a processor unit 201 that may be employed by some embodiments of the invention, it should be appreciated that this illustration is representative only, and is not intended to be limiting. It also should be appreciated that, with some implementations, a multi-core processor unit 111 can be used in lieu of multiple, separate processor units 111. For example, rather than employing six separate processor units 111, an alternate implementation of the invention may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the invention may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the invention, either the computer 103, one or more of the servant computers 117, or some combination of both may use two or more different interface devices 113 or 123 for communicating over multiple communication interfaces.

With various examples of the invention, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the invention, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the invention.

Clustering Tool

Figure 3:
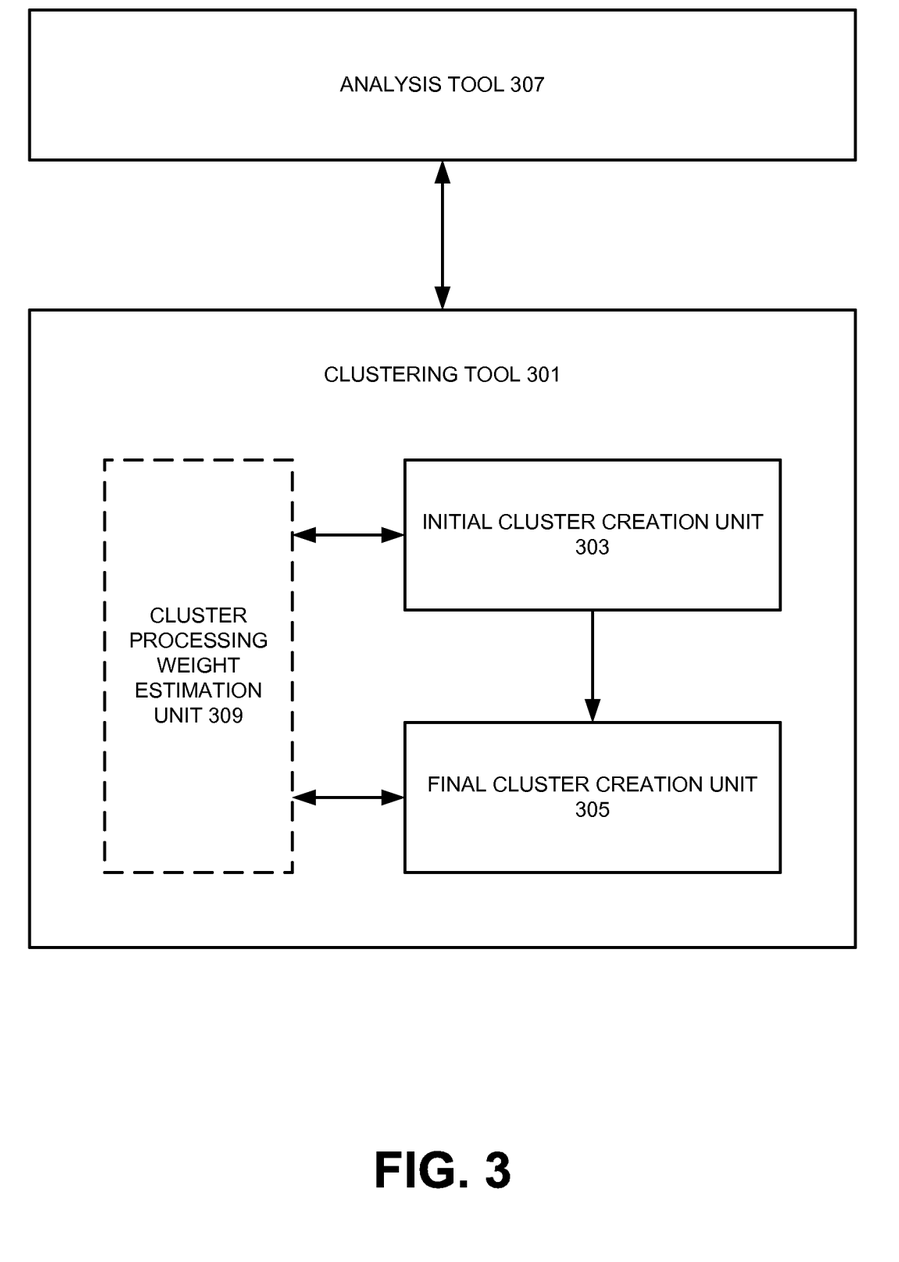
FIG. 3 illustrates an example of a clustering tool that may be implemented according to various embodiments of the invention.

FIG. 3 illustrates an example of a clustering tool 301 that may be implemented according to various embodiments of the invention. As seen in the illustrated example, the clustering tool 301 includes an initial cluster creation unit 303 and a final cluster creation unit 305. As also shown in FIG. 3, the clustering tool 301 may work in combination with an analysis tool 307. The analysis tool 307 may be any type of suitable conventional analysis tool that can be used to perform a desired analysis of the circuit design. For example, if the desired analysis is timing analysis, then the analysis tool 307 may be a conventional timing analysis tool, such as the Prime Time timing analysis tool available from Synopsys, Inc., of Mountain View, Calif., the Encounter Timing System timing analysis tool available from Cadence Design Systems of San Jose, Calif., and the Olympus SoC timing analysis tool available from Mentor Graphics Corporation of Wilsonville, Ore.

As previously noted, various examples of the invention may be implemented by a multiprocessor computing system, such as the multiprocessor computing system 101 illustrated in FIG. 1. Accordingly, one or more components of each of the initial cluster creation unit 303 and the final cluster creation unit 305 may be implemented using one or more processors in a multiprocessor computing system's master computer, such as the master computer 103, one or more servant computers in a multiprocessor computing system, such as the servant computers 117, or some combination of both, programmed using software instructions to provide a special-purpose computing device. Of course, still other embodiments of the invention may be implemented by, for example, one or more computer-readable devices having such software instructions stored thereon in a non-transitory manner, i.e., stored over a period of time such that they may be retrieved for use at any arbitrary point during that period of time.

It also should be appreciated that, while the initial cluster creation unit 303 and the final cluster creation unit 305 are shown as separate units in FIG. 3, a single servant computer (or a single processor within a master computer) may be used to implement both of these modules at different times, or components of both of these modules at different times. In addition, the clustering tool 301 is shown in the illustrated example as being separate from the analysis tool 307. With various implementations of the invention, however, some or all of the functionality of the analysis tool 307 may be incorporated into the clustering tool 301.

As will be discussed in more detail below, the initial cluster creation unit 303 grows clusters of nets. As used herein, the term "cluster" refers to an association of nets (or corresponding circuit design structures) in a circuit design, such as an integrated circuit design. A cluster may be implemented using a data object, such as a table, a set of linked references, or a defined relationship in a relational database. Also, as used herein, the term "design" is intended to encompass data describing an entire microdevice, such as an integrated circuit device or microelectromechanical system (MEMS) device. This term also is intended to encompass a smaller group of data describing one or more components of an entire microdevice, however, such as a layer of an integrated circuit device, or even a portion of a layer of an integrated circuit device. Still further, the term "design" also is intended to encompass data describing more than one microdevice, such as data to be used to create a mask or reticle for simultaneously forming multiple microdevices on a single wafer. The layout design data may be in any desired format, such as, for example, the Graphic Data System II (GDSII) data format or the Open Artwork System Interchange Standard (OASIS) data format proposed by Semiconductor Equipment and Materials International (SEMI). Other formats include an open source format named Open Access, Milkyway by Synopsys, Inc., and EDDM by Mentor Graphics, Inc.

Once the initial cluster creation unit 303 has created clusters, the final cluster creation unit 305 combines the clusters. More particularly, the final cluster creation unit 305 combines the grown clusters in a manner corresponding to the resources available to perform a process on the circuit design, as will be discussed in more detail below. For example, the final cluster creation unit 305 may combine the grown clusters in a manner that balances estimated runtimes for executing the process.

Cluster Formation

Figure 4:
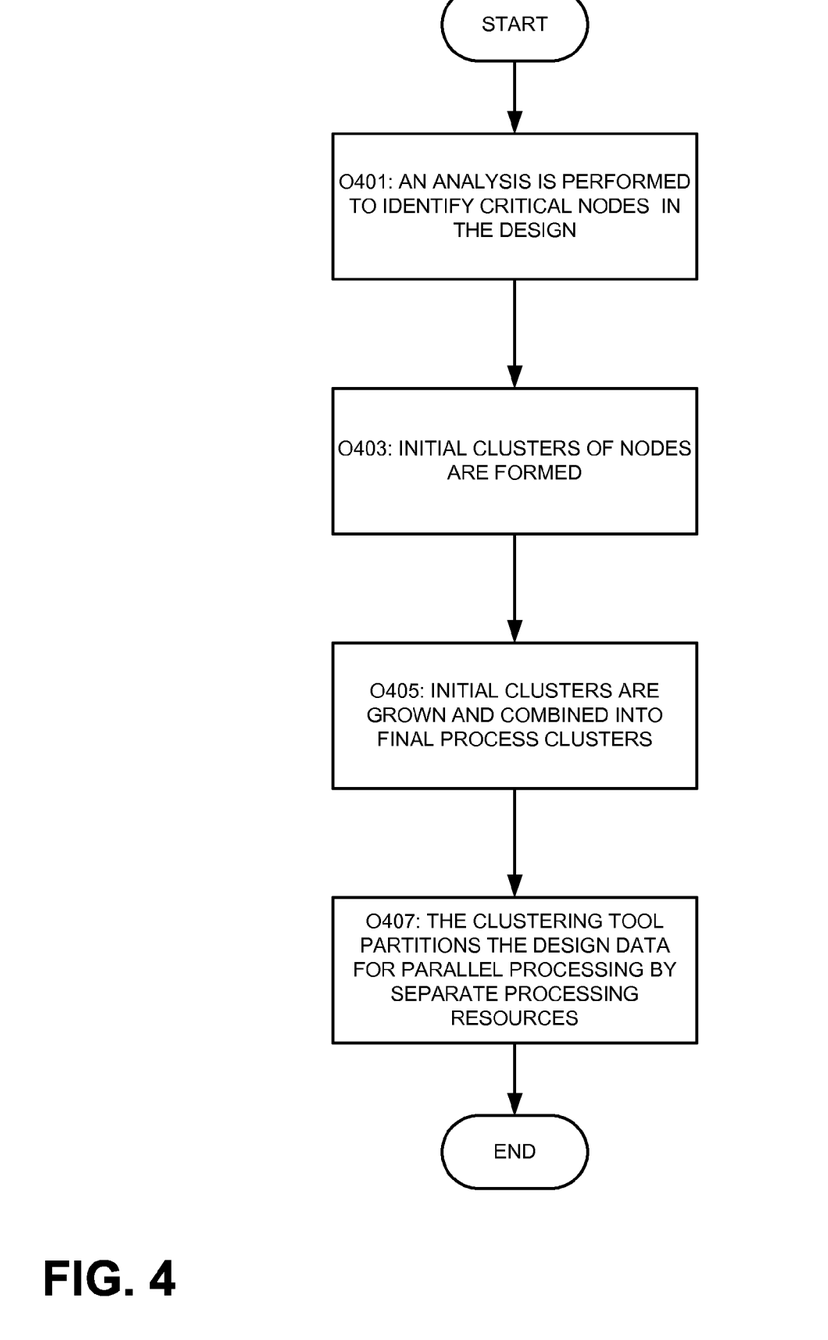
FIG. 4 illustrates a flowchart showing one method for creating clusters according to various examples of the invention.

FIG. 4 illustrates a method of clustering that may be implemented according to various embodiments of the invention. While the method illustrated in FIG. 4 will be described with reference to the clustering tool 301 illustrated in FIG. 3, it should be appreciated that various implementations of the invention may employ variations of a clustering tool different from the clustering tool 301. Similarly, it should be appreciated that the clustering tool 301 may be employed with variations of clustering methods different from the clustering method illustrated in FIG. 4.

Initially, in operation 401, the analysis tool 307 performs an analysis of the design to identify relevant or "critical" nodes in the design. Various examples of the invention will be described with reference to the use of a timing analysis tool for the analysis tool 307 to perform, e.g., a timing optimization process. With some of these implementations, for example, the analysis tool 307 analyzes the design data to identify nodes that are creating delays in critical paths, such that the signals will not traverse these critical paths in sufficient time for the circuit to meet the required operating speed. For a conventional timing optimization process, the timing violations on the paths are addressed on nodes with the largest potential for correcting the timing violations. Conventional timing optimization processes may involve various conventional techniques to modify, replace, or remove cells, modify or add buffers or inverters to the affected nets, replace a group of cells and nets with another group of cells and nets, or some combination of each of these techniques. Accordingly, with these described examples relating to timing optimization processes, the nodes will typically be the output pins of the cells in the circuit design data.

It should be appreciated, however, the node may alternately or additionally be any net in a circuit design. As previously noted, the analysis tool 307 may employ any variety of conventional timing analysis techniques. Further, various implementations of the invention may be configured for use with other processes, such as a setup slack compliance process, a hold transition time compliance process, an area minimization process, a power leakage reduction process, etc. With each of these process, the analysis tool 307 in those embodiments of the invention will identify the nodes based upon the particular analysis criteria associated with the process to be performed.

Next, in operation 403, the initial cluster creation unit 303 creates initial clusters of nodes. With various implementations of the invention, the initial cluster creation unit 303 will identify critical nodes relevant to the process to be executed on the design data. For performing a timing analysis to execute a timing optimization process, for example, the initial cluster creation unit 303 will identify the nodes having the worst delay impact (e.g., the nodes having the lowest slack) on signal transmission. For a setup hold optimization process, the nodes may be selected based upon timing violations, while for an area/leakage power minimization process, the nodes may be selected based upon the appropriate fan-in cones, etc. Returning to the examples relating to timing optimization, after the critical nodes have been selected, the initial cluster creation unit 303 will then grow clusters of nodes around those "worst-case" nodes.

Figure 5:
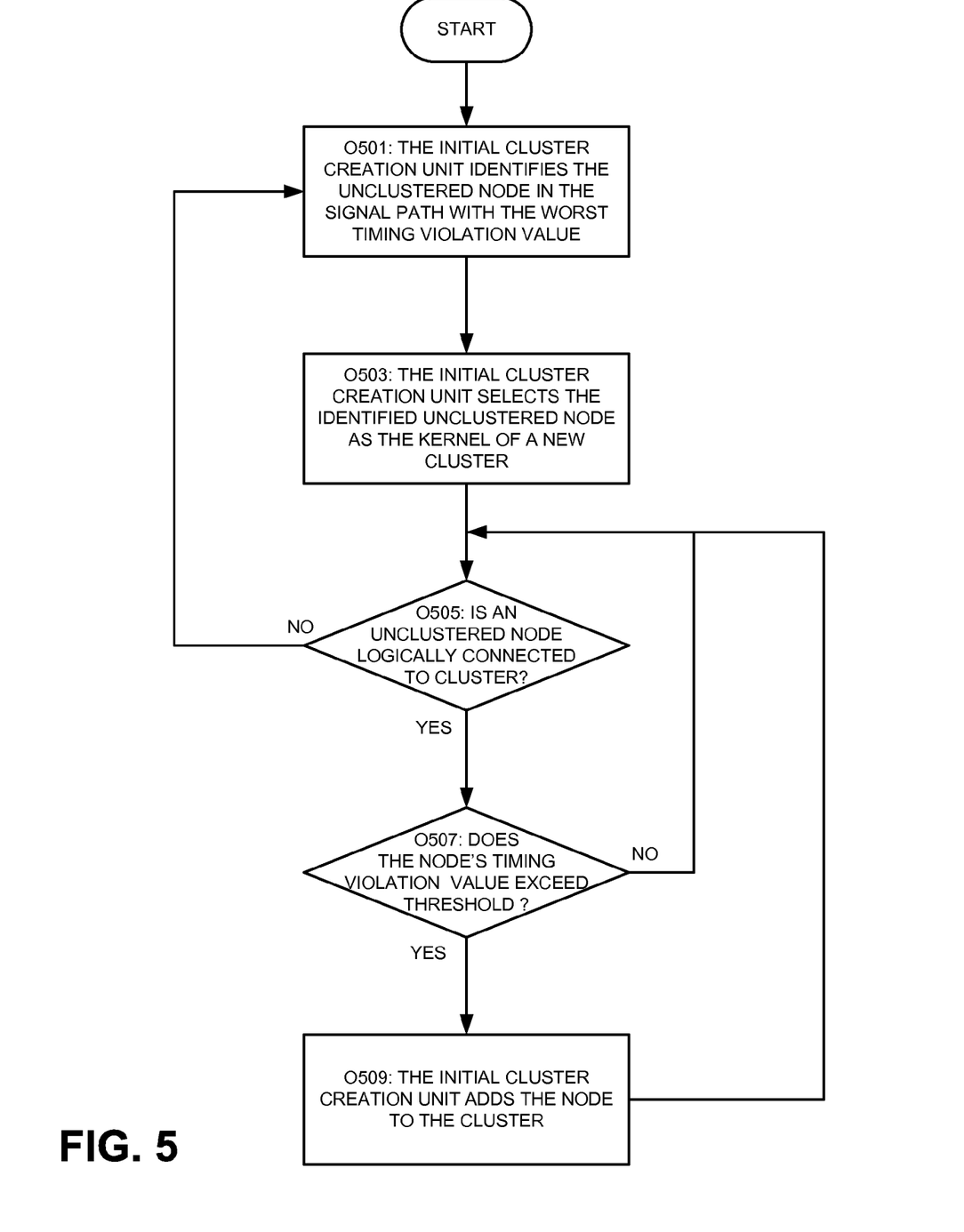
FIG. 5 illustrates a flowchart showing one method for creating initial clusters in a signal path according to various examples of the invention.

FIG. 5 illustrates a flowchart showing one method for creating initial clusters in a signal path for a timing optimization process according to various examples of the invention. As seen in this figure, in operation 501, the initial cluster creation unit 303 identifies the unclustered node (i.e., a node not already included in a cluster) in a critical signal path with the worst timing violation value. The initial cluster creation unit 303 may determine the timing violation value for each node by, for example, walking backward along the signal path to determine how much each node along that path contributes to the final delay violation based upon the "required time of arrival" for each node. As will be appreciated by those of ordinary skill in the art, this information is determined by the timing analysis tool (i.e., implemented by timing analysis tool 307). In operation 503, the initial cluster creation unit 303 then selects the identified unclustered node as the kernel of a new cluster.

Next, the initial cluster creation unit 303 determines if an unclustered node is logically connected to the cluster in operation 505. In the illustrated example, the initial cluster creation unit 303 identifies unclustered nodes that are directly logically connected to the cluster without an intermediate node therebetween, but other implementations of the invention may identify unclustered nodes that are logically connected to the cluster through one or more intervening nodes. If there are no unclustered nodes logically connected to the cluster, then the method returns to operation 501 to create a new cluster. If there is an unclustered node logically connected to the cluster, then, in operation 507, the initial cluster creation unit 303 determines if the logically connected unclustered node has a timing violation value that exceeds a cluster addition threshold value. If the logically connected unclustered node has a timing violation value that exceeds the cluster addition threshold value, then in operation 509, the node is added to the cluster. Otherwise, the process returns to operation 505 to determine if there is another unclustered node logically connected to the cluster. Operations 505-509 then are repeated until there are no unclustered nodes with timing violation values exceeding the threshold value, at which point the formation of the clusters is completed.

Once a cluster has been completed, operations 501-509 are repeated on the node with the next worst violation in the signal path, to form another initial cluster. With various implementations of the invention, operations 501-509 are repeated until all of the nodes in the signal path are assigned to clusters. With alternate implementations of the invention, however, operations 501-509 will be repeated only until there are no nodes in the signal path that have timing violations exceeding a cluster creation threshold value. In some embodiments of the invention, the cluster creation threshold value may be the same as the cluster addition threshold value. In still other embodiments, however, the cluster creation threshold value will be greater than or less than the cluster addition threshold value. Once all of the initial clusters have been created for the signal path, the process illustrated in FIG. 5 is repeated for each the remaining critical signal paths. In this manner, clusters are created for the critical signal paths in a circuit design.

It should be appreciated that various implementations of the invention may use alternate or additional criteria to determine the size of the initial clusters. For example, some implementations of the invention may employ a cluster addition threshold value that is a percentage of the timing violation of the kernel node, rather than an absolute value. Alternately or additionally, some implementations of the invention may employ a level depth analysis to determine whether a logically connected unclustered node should be added to a cluster. For example, with some embodiments of the invention, the cluster growing unit 303 may add all unclustered nodes logically connected to the kernel node through up to two intervening nodes, regardless of the timing violation values for those nodes. With still other embodiments of the invention, the cluster growing unit 303 may add only unclustered nodes logically connected to the kernel node through no more than two intervening nodes, regardless of the timing violation values for other nodes logically connected to the kernel node. Still further, information related to the processing resources may be used to control the size of the initial clusters.

For example, an optional cluster processing weight estimation unit 309 may be used to limit the size of the initial clusters. With various implementations of the invention, the cluster processing weight estimation unit 309 will employ a cost function or other calculation, such as evaluation of heuristics, to estimate the amount of time required to optimize a particular cluster. The cluster processing weight estimation unit 309 may take into account a variety of criteria, such as for example, the size of cluster, the amount of slack in the violations, the number of path endpoints that end in the cluster, the size of the nets in the cluster, the relative complexity of the cells in the cluster, etc. A wide variety of techniques for creating and implementing such a cluster processing weight estimation unit 309 are well known in the art, and will not be discussed here in detail.

By estimating the processing time needed to perform the desired process on a cluster, the cluster processing weight estimation unit 309 can ensure that the cluster does not grow beyond a weight compatible with the amount of available processing resources (e.g., the processing time needed to load balance the available processors for processing the design data). For example, if there are four processors of equal capacity available to process the design data, and each processer will process one cluster, then the estimated processing weight (e.g., the processing time) of any cluster should not exceed one quarter of the total processing weight of the entirety of the design data. Similarly, if each processer will process two clusters, then the estimated processing weight (e.g., the processing time) of any cluster should not exceed one eighth of the total processing weight of the entirety of the design data.

In this manner, various implementations of the invention will typically create a relatively large number of clusters with respect to the amount of design data process resources. As will be explained in more detail below, this arrangement will providing a set of initial clusters having a relatively small cluster granularity relative to the available processing resources, which can then be grown, combined or some combination of both to reach a granularity of final clusters that effectively matches the amount of available processing resources.

Figure 6:
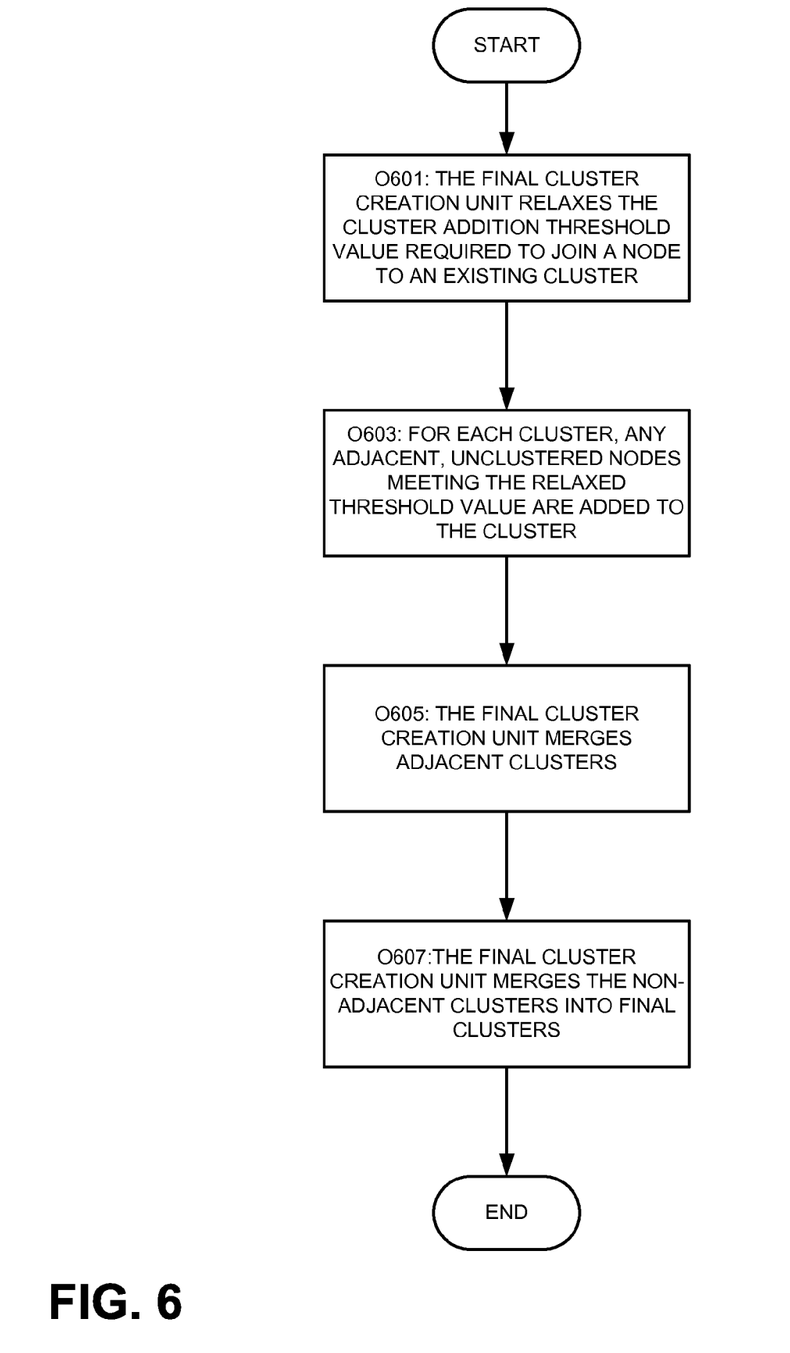
FIG. 6 illustrates a flowchart showing one method for creating final clusters in a signal path for a timing optimization process according to various examples of the invention.

After the initial clusters have been determined, in operation 405 the final cluster creation unit 305 grows or combines the initial clusters into final clusters for use in a design data process, such as a timing optimization process. FIG. 6 illustrates a flowchart showing one method for creating final clusters in a signal path for a timing optimization process according to various examples of the invention. With various embodiments of the invention, the cluster growing unit 303 initially will attempt to grow the initial clusters into final clusters. For example, as illustrated in Figure, in operation 601, the final cluster creation unit 305 relaxes the cluster addition threshold delay violation value originally required to join a node to an existing cluster. Then, for each cluster, the cluster growing unit 303 determines if any of the adjacent, unclustered nodes now meet the relaxed threshold. If an unclustered node adjacent to a cluster meets the relaxed threshold, then that unclustered node is added to the cluster in operation 603.

As one or more unclustered nodes are added to a cluster, the final cluster creation unit 305 may employ the cluster processing weight estimation unit 309 to track the processing weight of the cluster, to assure that it does not exceed the maximum designated amount. As previously noted, the processing weight of a cluster should not exceed the processing weight of the other final clusters so that the processing weight of each of the final clusters is balanced with respect to the processing resources. When a cluster reaches the maximum weight, the final cluster creation unit 305 stops the growth of this cluster, and designates it a final cluster for processing. The final cluster creation unit 305 continues to grow the remaining clusters until each cluster reaches the maximum weight, or until the clusters can no longer be grown. As noted above, the clusters are grown so that, while two clusters can be adjacent, they will not overlap.

If the design data is relatively compact, there may not be a number of separate clusters that reach the maximum weight equal to the amount of available processing resources, in which case the process may be run on the clustered design data using less than the total amount of available processing resources. More typically, however, there will be a large number of clusters that do not grow to the maximum weight, leaving a larger number of separate clusters than available processing resources.

If this occurs, the final cluster creation unit 305 merges the clusters. More particularly, in operation 605, the final cluster creation unit 305 merges adjacent clusters. First, the final cluster creation unit 305 identifies nodes bordering two or more clusters. Next, the final cluster creation unit 305 merges adjacent clusters through the "worst" border between them (i.e., the node between clusters with the highest timing delay violation). It should be noted that, with various examples of the invention, the cluster processing weight estimation unit 307 continues to estimate the processing weight of potential clusters. Clusters are not merged if the resulting cluster would exceed the maximum weight Once adjacent clusters have been merged, then, in operation 607 the final cluster creation unit 305 merges the non-adjacent clusters into final clusters. With various examples of the invention, the final cluster creation unit 305 will merge the clusters so that none of the remaining final clusters exceeds the maximum processing weight. For example, with equal processing resources, in various implementations of the invention the cluster combination unit 305 will merge the clusters so that each of the remaining final clusters has the same processing weight. Various implementations of the invention may employ any desired technique for merging non-adjacent clusters. For example, some embodiments of the invention may employ a well-known "greedy" algorithm to merge the remaining non-adjacent clusters.

It should be appreciated that, while operations 501-509 and operations 601-607 have been described with particular relevance for use with a timing optimization process, the principles disclosed in these operations may be applicable to embodiments of the invention configured for implementing other processes on design data. Also, it should be appreciated that embodiments of the invention configured for implementing other processes may employ alternate or additional steps to start, grow and merge clusters of nodes in design data. For example, after merging all non-adjacent clusters, embodiments of the invention configured for implementing an area optimization process or power leakage minimization process may additionally perform a final pass of the design data to ensure that all nets and cells are included in a cluster.

Once the final clusters have been determined, in operation 407 the clustering tool 301 (or some other unit of the computing system designated to perform this function) partitions the design data according to the clusters, and provides the partitioned data to separate processing resources for processing in parallel. For example, if an implementation of the invention divides design data into four equal clusters for processing by four equal processor cores, the clustering tool 301 will partition the design data as designated by the clusters. It will then provide each processor core with one of the partitioned clusters of data for processing. Similarly, if an implementation of the invention divides design data into eight equal clusters for processing by four equal processor cores, the clustering tool 301 will partition the design data as designated by the clusters. It may then provide each processor core with two of the partitioned clusters of data for sequential processing. With some implementations of the invention, the clustering tool 301 may provide the design data associated with each final cluster directly to a separate iteration of the electronic design automation process. Alternately or additionally, some implementations of the invention may store the design data associated with each final cluster of nodes at different storage locations for access by different iterations of the electronic design automation process.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

What is claimed is:

1. A method of partitioning portions of a circuit design for an electronic design automation process, comprising:
    generating one or more initial clusters of nodes from the circuit design by employing a computing system to
        identify one or more critical paths in the circuit design that do not meet specified timing requirements,
        select one or more nodes in the critical paths that have timing violations, and
        grow the initial clusters of nodes from the selected nodes, wherein each initial cluster of nodes includes at least one node having a timing violation exceeding a threshold value and having a logical connection to at least another node in the initial cluster of nodes;
    employing a computing system to create one or more final clusters of nodes from the initial clusters of nodes based upon processing weight values for processing the final clusters of nodes according to the electronic design automation process; and
    employing a computing system to partition the circuit design according to the final clusters of nodes.

2. The method recited in claim 1, wherein generating one or more initial clusters of nodes further comprising employing the computing system to grow the initial clusters from the selected nodes until no nodes having a logical connection to at least another node in the initial clusters of nodes also have a timing violation exceeding the threshold value.

3. The method recited in claim 1, wherein generating one or more initial clusters of nodes further comprising employing the computing system to grow the initial clusters from the selected nodes until no nodes have a timing violation exceeding the threshold value, or an initial cluster limitation criteria is satisfied.

4. The method recited in claim 3, wherein the initial cluster limitation criteria is selected from the group consisting of: a maximum node depth from the selected node, a maximum processing time for processing the initial cluster of nodes according to the electronic design automation process, a maximum number of nodes in the initial cluster of nodes, a number of net endpoints that end in the initial cluster of nodes, a maximum size of nets in the initial cluster of nodes, and a maximum number of relatively complex cells in the initial cluster of nodes.

5. The method recited in claim 1, wherein employing the computing system to create the one or more final clusters of nodes further comprising
    selecting an initial cluster of nodes; and
    growing the selected initial cluster of nodes by
        analyzing nodes logically connected to the selected initial cluster of nodes to determine if the analyzed nodes have a timing violation exceeding another threshold value, and
        if an analyzed node has a timing violation exceeding the another threshold value, adding the analyzed node to the selected initial cluster of nodes.

6. The method recited in claim 5, wherein growing the selected initial cluster of nodes is performed until no analyzed nodes have a timing violation exceeding the second threshold value.

7. The method recited in claim 5, wherein the growing the selected initial cluster of nodes is performed until no analyzed nodes have a timing violation exceeding the second threshold value, or a cluster limitation criteria is satisfied.

8. The method recited in claim 7, wherein the cluster limitation criteria is selected from the group consisting of: a maximum node depth from the critical node, a maximum processing time for processing the selected initial cluster of nodes according to the place and route process, a maximum number of nodes in the selected initial cluster of nodes, a number of endpoints that end in the selected initial cluster of nodes, a maximum size of nets in the selected initial cluster of nodes, and a maximum number of relatively complex cells in the selected initial cluster of nodes.

9. The method recited in claim 1, wherein employing the computing system to generate the one or more final clusters of nodes further comprising employing the computing system to combine two or more initial clusters of nodes into a final cluster of nodes such that processing weight of final cluster of nodes does not substantially exceed a maximum processing weight value.

10. The method recited in claim 9, further comprising combining the clusters of nodes by
    identifying border nodes between the initial clusters of nodes; and
    merging a plurality of the initial clusters of nodes into a final cluster of nodes along the border nodes with the largest timing violations.

11. The method recited in claim 1, wherein employing a computing system to partition the circuit design according to the final clusters of nodes comprises:
    providing the nodes in a first final cluster of nodes to a first iteration of the electronic design automation process for execution; and
    providing the nodes in a second final cluster of nodes to a second iteration of the electronic design automation process for execution.

12. The method recited in claim 11, wherein the execution of the first iteration of the electronic design automation process is independent of the execution of the second iteration of the electronic design automation process.

13. The method recited in claim 1, wherein employing a computing system to partition the circuit design according to the final clusters of nodes comprises:
    storing design data for the nodes in a first final cluster of nodes at a first storage location; and
    storing design data for the nodes in a second final cluster of nodes at a second storage location separate from the first storage location.

14. The method recited in claim 1, wherein employing a computing system to partition the circuit design according to the final clusters of nodes further comprising modifying the circuit design to distinguish nodes in a first final cluster from nodes in a second final cluster.

15. The method recited in claim 1, further comprising:
executing a first iteration of the electronic design automation using design data associate with a first final cluster of nodes; and
executing a second iteration of the electronic design automation process using design data associated with a final cluster of nodes.

16. The method recited in claim 1, wherein a processing weight value for a final cluster of nodes is the time required to process the design data associated with the final cluster of nodes using the electronic design automation process.

17. An apparatus comprising at least one computer-readable memory device storing instructions configured to cause one or more processing devices to perform operations comprising:
identifying one or more critical paths in a circuit design that do not meet specified timing requirements;
selecting one or more nodes in the critical paths based on timing delays associated with the one or more nodes;
forming one or more initial clusters of nodes by grouping the selected nodes with one or more additional nodes in the circuit design based on timing delays associated with the one or more additional nodes, wherein each additional node grouped into a corresponding initial cluster of nodes has a logical connection to at least another node in the corresponding initial cluster of nodes;
generating one or more final clusters of nodes based, at least in part, on the initial clusters of nodes and processing weight values for processing the final clusters of nodes according to the electronic design automation process; and
partitioning the circuit design according to the final clusters of nodes.

18. The apparatus of claim 17, wherein forming one or more initial clusters of nodes further comprising growing the initial clusters from the selected nodes until none of the additional nodes have a timing violation exceeding a threshold value, or a satisfaction of an initial cluster limitation criteria.

19. The apparatus of claim 17, wherein generating the one or more final clusters of nodes further comprising:
selecting an initial cluster of nodes;
identifying nodes logically connected to the selected initial cluster of nodes; and
including one or more of the identified nodes in the selected initial cluster of nodes based on timing delays associated with the one or more of the identified nodes.

20. The apparatus of claim 17, wherein generating the one or more final clusters of nodes further comprising combining two or more initial clusters of nodes into a final cluster of nodes.

* * * * *